April 25, 1961   L. A. CUMMARO   2,980,929
PROCESS FOR MANUFACTURING INSERTS
Filed Oct. 28, 1957   2 Sheets-Sheet 1

INVENTOR.
LOUIS A. CUMMARO
BY
BUCKHORN, CHEATHAM & BLORE
ATTORNEYS

April 25, 1961 L. A. CUMMARO 2,980,929
PROCESS FOR MANUFACTURING INSERTS
Filed Oct. 28, 1957 2 Sheets-Sheet 2

INVENTOR.
LOUIS H. CUMMARO
BY
BUCKHORN, CHEATHAM & BLORE

ATTORNEYS

United States Patent Office 2,980,929
Patented Apr. 25, 1961

2,980,929
PROCESS FOR MANUFACTURING INSERTS
Louis A. Cummaro, Monterey, Mass., assignor to Phillips Screw Company, New York, N.Y., a corporation of New York Filed Oct. 28, 1957, Ser. No. 692,710
7 Claims. (Cl. 10—10)

The present invention relates to a method of manufacturing a threaded metal article and more particularly a threaded insert member such as shown in my prior Patent No. 2,783,811. Such inserts have been manufactured heretofore upon automatic screw machines utilizing cylindrical straight rods, such as for example, round bar stock. Such rods are chucked in a screw machine and operations performed succesively on the endmost portion of the rod partially to form the internally and externally threaded insert with certain finishing steps performed on other second operation equipment after severing of the partially finished insert from the round bar stock. However, round bar stock is initially expensive and the inherent slowness of operations performed on the automatic screw machines and problems in subsequent handling of the partially finished inserts has kept the rate of production slow and caused the inserts to be comparatively expensive.

It is therefore an object of the present invention to provide a method of manufacturing inserts which enables inserts to be manufactured with a great increase in rate as compared with the rate heretofore possible.

More particularly an object of the present invention is to provide a method whereby inserts may be manufactured at a greatly reduced cost.

A further object is to provide a method for manufacturing inserts of the type described or like articles which will enable the utilization of fast operating forming apparatus.

Another object of the present invention is to provide a method for manufacturing inserts which facilitates the handling of the inserts during the course of their manufacture.

Another important object of this method is to provide interior operational quality control not available through screw machine methods.

Still another object of the invention is to provide a method of manufacturing inserts which permits the use of coiled stock material which is inherently low in cost.

Other objects and advantages of the invention will become more apparent hereinafter.

In accordance with the present invention, threaded articles such as inserts are formed by first providing stock pieces having a cylindrical shank, of sufficient diameter for the forming of the article therefrom, and an enlarged head portion. Thereafter the stock pieces are transferred successively by mechanical hopper feeds to various work stations at which forming operations are performed upon the shank necessary in the formation of the desired article. The enlarged head portion of the work piece is utilized to guide the pieces in automatic feed mechanism between work stations and at certain stations such head portion is utilized to secure the stock piece while work is performed upon the shank. Upon completion of all operations wherein the head portion is no longer of utility for the aforesaid purposes, it is severed from the shank and discarded.

For a more detailed description of the invention, reference is made to the following specification taken in conjunction with the accompanying drawings wherein.

Figure 10:
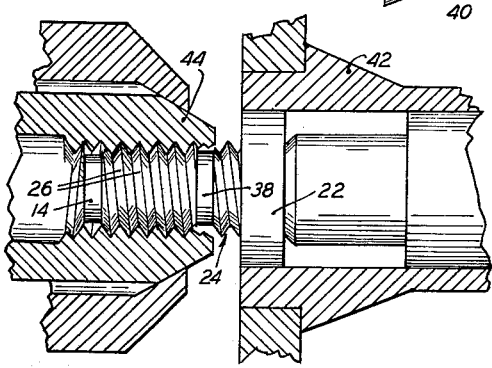
Figure 11:
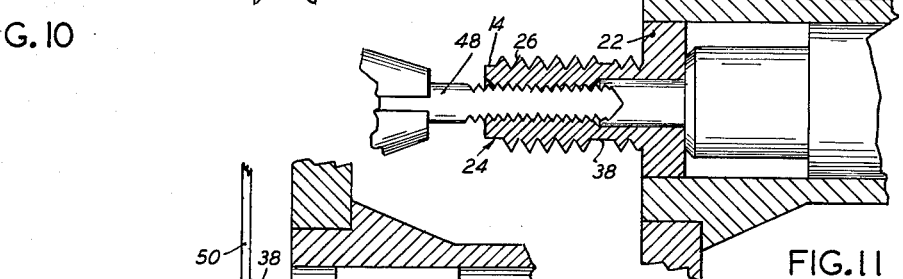

Fig. 10 discloses the subsequent step of rechasing the threads of the insert to remove any burrs thereon from forming and milling operations;

Fig. 11 illustrates the step of tapping the bores; and

Figure 12:
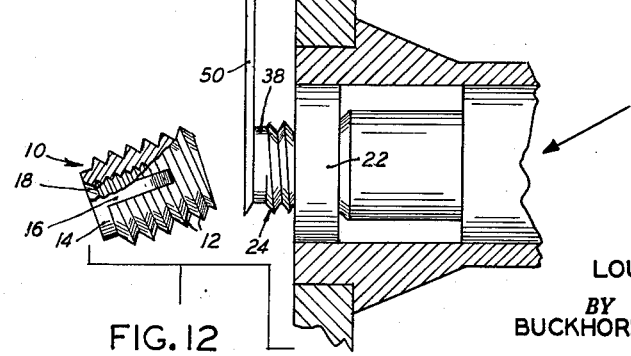

Fig. 12 discloses the final step of severing the completed insert from the head portion of the shank.

Figure 1:
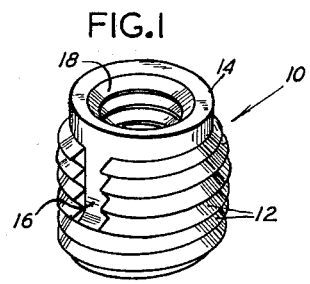
Fig. 1 is an enlarged perspective view of an insert such as may be manufactured in accordance with the present invention.

Referring first to Fig. 1 there is therein illustrated a threaded article and particularly a fastener or insert 10, such as shown in my Patent No. 2,783,811, and which may be manufactured in accordance with the method of the subject application. The insert 10 comprises a hollow body including a shank having external threads 12 formed thereon and a head portion 14 having a diameter substantially equal to the root diameter of the threaded portion 12. The threaded portion 12 is provided with a pair of diametrically oppositely positioned slots or keyways 16 which extend parallel to the axis of the insert downwardly from the head portion 14 for about three or four thread pitches. The insert 10 is also provided with internal threads 18 for receivng a bolt or other cooperatively threaded device. As clearly shown in my prior Patent 2,783,811, the fastener or insert 10 is adapted to be installed in a parent body by means of the threaded portion 12 and to be locked in position by means of a locking member including a ring which fits about the head portion 14 and from which ring project a pair of elongate prongs or keys which engage within the keyways 16 and in installation are driven through the threads of the parent body to form keyways therein.

Figure 2:
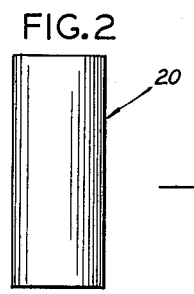
Fig. 2 is an elevation of stock which may be used in the manufacture of an insert shown in Fig. 1.
Figure 3:
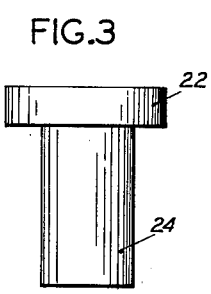
Fig. 3 is a view showing the stock piece of Fig. 2 with a head formed thereon.
Figures 4, 5:
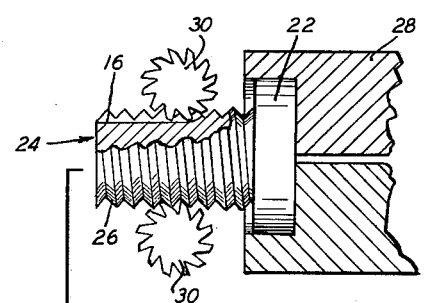
Fig. 4 is an elevation showing the appearance of the stock piece after threads have been formed upon the shank thereof.
Fig. 5 is a schematic view showing the subsequent operation of milling key slots in the periphery of the threaded shank of the insert.
Figures 6, 7:
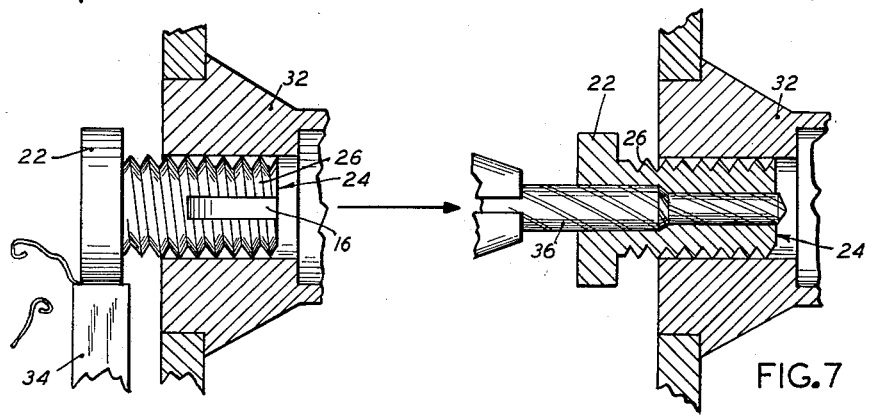
Fig. 6 illustrates a subsequent step wherein the upset head is shaved to concentricity with the threaded shank.
Fig. 7 illustrates a subsequent step of providing a bore in the insert.
Figure 8:
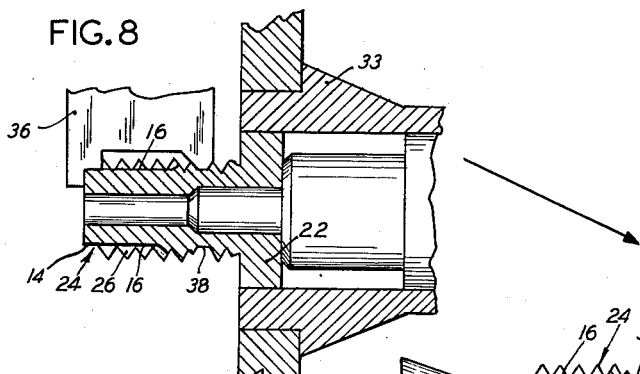
Fig. 8 is a schematic view showing a subsequent step wherein the insert is grasped by the head and the shank egnaged with a forming tool to provide the insert with the desired configuration.

Referring now to the other views of the drawing in manufacturing a threaded article such as the insert 10 in accordance with the present invention, there is first provided a stock piece or blank having an enlarged head and a smaller cylindrical shank from which the article is formed. This blank may be formed by first providing a piece 20 (Fig. 2) of cylindrical stock and which may be ordinary inexpensive coiled wire stock and upsetting one end thereof, such as on an automatic cold heading machine, to form an enlarged head 22 thereon and a shank portion 24 as shown in Fig. 3. Threads 26 are then formed on the shank 24 by rolling or other suitable process and which will be well known to those skilled in the art. After forming the threads 26, the blanks are fed to a suitable milling machine in which the blank is grasped by the head 22 as shown in Fig. 5 by suitable chucks indicated at 28 and milling cutters 30 are brought into engagement with the shank to cut therein the keyways 16. In the movement of the individual blanks from the thread forming operation to the milling operation, the head 22 on the blanks enables the blanks to be fed to and to be positioned within the chucks 28 of the milling mechanism by means of conventional automatic feed mechanism not herein illustrated since such mechanism is well known and the particular type used forms no part of the present invention. Use of the automatic feed mechanisms eliminates, of course, costly manual handling of the blanks and obviously the presence of the head 22 greatly facilitates proper endwise orientation of the blanks.

After the keyways 16 have been milled in the shank 24, the blank is released and again fed by means of the head 22 to another work station wherein the blank is grasped by the shank 24 by means of a chuck indicated schematically at 32. The work piece is rotated by the chuck 32 and a forming tool 34 is applied to the head 22 so as to shave the head concentrically with the threads 26. While the insert is thus grasped or in a subsequent work station, and to which the blank may be again fed and orientated by means of the head 22, the blank is bored and back chamfered with a boring and chamfering tool such as that indicated at 36.

Figure 9:
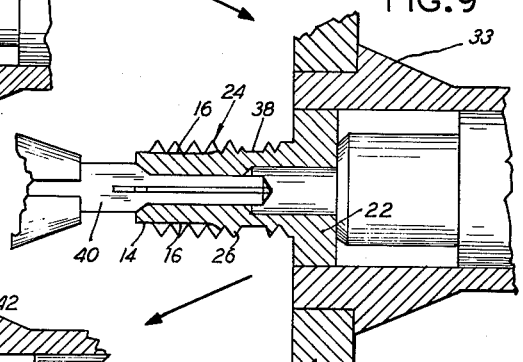
Fig. 9 is a schematic view showing a subsequent reaming step to ream the bore of the insert.

The blank is then released and again fed and located by means of the head 22 at a subsequent work station whereat the blank is grasped by the head 22 within a chuck indicated at 33. While the blank is rotated with the chuck 33, it is approached with a forming tool 36 which cuts away part of the threads to form on the end of the shank 24 remote from the head 22 the insert head portion 14, the forming tool 36 at the same time shaving away the threads at what will be the bottom end of the insert and as indicated at 38. Thereafter, either while the blank is still grasped in the chuck 33 or after it is fed and located in another subsequent work station and again grasped by the head 22, it is engaged with a reaming tool 40 to ream the bore as indicated in Fig. 9.

The blank is then preferably fed to a subsequent work station provided with a chuck indicated at 42 and by which the blank is grasped by its head 22 and a rechasing tool 44 applied to the threads of the blank as the same is rotated so as to remove any burr that may have been formed on the threads by the previous milling and machining operations.

Finally, the blank is fed to another work station whereat it is grasped again by the head 22 in a chuck indicated at 46 and whereat the bore of the blank is first tapped with a tapping tool indicated at 48 and thereafter a cutoff tool 50 is applied to sever the finished insert 10 from the head portion 22.

As indicated previously, the method hereinbefore described is advantageous in several respects, the first advantage being that the headed blanks may be formed from any suitable stock such as inexpensive wire or die drawn screw stock such as is supplied in large coils and which is relatively inexpensive as compared to round bar stock.

A more important advantage of the method here disclosed is that the various forming operations may be performed on high speed machines capable of operating and producing pieces at a much greater rate and at substantially lower unit cost than is possible utilizing automatic screw machines to which are fed round bar stock. Also the provision of the head 22 facilitates the use of automatic feeding mechanisms to feed the stock pieces with rapidity from one machine to another, at the same time properly indexing or orientating them and also, as clearly indicated in the views, provides a convenient means for grasping the work piece while various of the machine operations are performed on the blank. Since the feeding of the work pieces between work stations is facilitated by the head 22, a variety of work performing apparatus may be used so as to secure the most efficiently operating apparatus for a particular work station. The relatively large diameter of the head also facilitates production of the insert with a relatively high degree of accuracy and precision since in chucking the insert by the head greater accuracy in positioning can be obtained. While the head material is ultimately wasted, the cost of the material used for the head is negligible as compared with the initial saving in material cost and other savings made possible.

Having illustrated and described the preferred embodiment of the invention, it should be apparent to those skilled in the art that the invention permits of modification in arrangement and detail. I claim as my invention all such modifications as come within the true spirit and scope of the appended claims.

I claim:

1. The method of manufacturing a threaded metal article comprising the steps of forming a blank having an enlarged cylindrical head and a cylindrical shank of reduced diameter, threading said shank, shaving said head concentrically with said threads feeding said blank through the use of said head to different successive operational stations, supporting said blank by means of said head in certain of said stations while machining operations are performed upon said shank, and finally severing the machined shank from said head.

2. The method of manufacturing a threaded metal article comprising the steps of upsetting an enlarged head on a blank of cylindrical stock to provide a headed blank, threading said shank, shaving said head concentrically with said threads feeding said blank through the use of said head to different successive operational stations, supporting said blank by means of said head and rotating the blank thereby at certain of said stations and performing machining operations upon said shank, and finally severing the machined shank from said head.

3. The method of manufacturing a threaded member which comprises the steps of providing a blank having an enlarged head and a smaller cylindrical shank, forming an external thread on said shank, grasping said blank by said shank and shaving said head concentrically with said thread, thereafter grasping said blank by said head and rotating the same about its longitudinal axis while applying cutting tools to the shank to perform concentric work upon the blank shank, and finally severing said head from said shank.

4. The method of manufacturing a threaded member which comprises the steps of forming a blank having an enlarged head and a smaller cylindrical shank, feeding said blank to successive work stations while utilizing said head to feed the blank to and position the blank at at least certain of said stations, forming a thread on said shank at one of said stations, grasping said blank by said threaded shank at another of said stations and shaving said head to a predetermined diameter concentric with said shank and at other of said stations grasping said blank by said shaved head and rotating the blank about its longitudinal axis while applying cutting tools to said shank so as to perform concentric work upon said shank, and finally severing said head from said shank.

5. The method of manufacturing a threaded insert which comprises the steps of forming a blank having an enlarged head and a smaller cylindrical shank, roll forming an external thread on said shank, grasping said blank by said head and forming a plurality of axially extending keyways in the periphery of said shank, grasping said blank by said shank and shaving said head to a predetermined diameter concentric with said shank and forming an axial bore through said blank, grasping said blank by said head and chamfering the terminal end of the shank and reaming the axial bore of said shank at the terminal end thereof, and thereafter rechasing the external threads of said shank, securing said blank by said head and tapping said bore, and finally severing the head from said shank.

6. The method of manufacturing a threaded insert which comprises the steps of upsetting one end of piece of cylindrical stock to form a blank having an enlarged head and a smaller cylindrical shank, roll forming an external thread on said shank, grasping said blank by said head in a predetermined position and forming a plurality of axially extending keyways in the periphery of said shank, grasping said blank by said shank and shaving said head to a predetermined diameter concentric with said shank and forming an axial bore through said blank, grasping said blank by said head and rotating the blank about its axis and applying tools chamfering the terminal end of the shank and reaming the axial bore of said shank at the terminal end thereof, again grasping said blank by said head and rotating the same and applying a tool to rechase the external threads of said shank, securing said blank by said head and tapping said bore, and finally severing the head from said shank.

7. The method of manufacturing a threaded insert which comprises the steps of forming a blank having an enlarged head and a smaller cylindrical shank, forming an external thread on said shank, grasping said blank by said head and milling a plurality of keyways in the periphery of said shank, grasping said blank by said shank and rotating the same thereby while shaving said head to a predetermined diameter concentric with the threaded portion of said shank and chamfer drilling an axial bore through said blank from the headed end thereof, grasping said blank by said head and rotating the same thereby while chamfering the terminal end of the shank and reaming the axial bore of said shank at the terminal end thereof and thereafter rechasing the external threads of said shank, securing said blank by said head and tapping said bore, and finally severing the head from said shank.

References Cited in the file of this patent

UNITED STATES PATENTS

| | | |
|---|---|---|
| 1,110,762 | Ferry | Sept. 15, 1914 |
| 1,458,006 | Runser | June 5, 1923 |
| 1,724,323 | Stroddard | Aug. 13, 1929 |
| 2,239,352 | Cherry | Apr. 22, 1941 |
| 2,309,260 | Strauss | Jan. 26, 1943 |
| 2,577,442 | Adams | Dec. 4, 1951 |
| 2,783,811 | Cummaro | Mar. 5, 1957 |
| 2,813,279 | Friedman | Nov. 19, 1957 |